United States Patent [19]
Regester

[11] Patent Number: 5,737,475
[45] Date of Patent: Apr. 7, 1998

[54] UNIVERSAL MULTIMEDIA CONNECTION UNIT

[75] Inventor: William D. Regester, Bothell, Wash.

[73] Assignee: Leviton Manufacturing Co., Inc., Little Neck, N.Y.

[21] Appl. No.: 783,920

[22] Filed: Jan. 17, 1997

[51] Int. Cl.$^6$ .................................................. G02B 6/00
[52] U.S. Cl. .................................. 385/134; 385/135
[58] Field of Search ............................. 385/134–140

[56] References Cited

U.S. PATENT DOCUMENTS

| | | | |
|---|---|---|---|
| 5,119,459 | 6/1992 | Meyerhoefer et al. | 385/135 |
| 5,367,598 | 11/1994 | Devenish, III et al. | 385/135 |
| 5,647,045 | 7/1997 | Robinson et al. | 385/135 |

*Primary Examiner*—Rodney B. Bovernick
*Assistant Examiner*—Hemang Sanghavi
*Attorney, Agent, or Firm*—Seed and Berry LLP

[57] ABSTRACT

A versatile multimedia connection unit or box for managing fiber optic cables and distributing individual fiber optic strands to separate connectors. In a preferred embodiment, the connection unit has a rectilinear housing defining a cavity with a distribution cell and a patch cell, a plurality of open-ended cable ports at various locations in the housing along its outer edges to pass fiber optic cable into the cavity, and a plurality of stackable cable-storage members adjustably attached to the housing to store extra fiber optic cable in the distribution cell. The connection unit also preferably has a removable front door hingedly attached to the front of the housing to provide access to the patch cell, a removable top door hingedly attached to the top of the housing to provide access to the distribution cell, and a removable rear door hingedly attached to the rear of the housing to provide additional access to the distribution cell. A plurality of connector cards with connectors and blank cards without connector are releasably mounted to a bulkhead bracket fixed to the housing in the cavity at a location that divides the cavity into the distribution cell and the patch cell. Each connector on a connector card has a distribution end in the distribution cell to which an individual fiber optic strand may be coupled and a patch end in the patch cell to which an internal line in a building may be coupled to optically couple the strand and line together.

12 Claims, 4 Drawing Sheets

UNIVERSAL MULTIMEDIA CONNECTION UNIT

TECHNICAL FIELD

The present invention relates to a connection unit for installing, operating, and reconfiguring communication lines in office buildings and other large scale applications.

BACKGROUND OF THE INVENTION

Multimedia and high-speed communication applications require sophisticated, reliable interconnections to bring communication lines into homes and offices. A single business, for example, may have a number of communication applications that require a significant amount of voice and data transmission capacity to operate audio-visual, computer, facsimile machines, and telephones. Voice and data communications are generally transmitted through electric wires, fiber optic cables with a plurality of fiber optic strands, coaxial cables, or microwave systems. Fiber optic lines are quickly becoming the most desirable transmission medium because they have a larger transmission capacity than other transmission medias. Thus, to handle the large volume of voice and data communications in many applications, commercial carriers that operate wide area networks and businesses that operate internal networks often install fiber optic cables.

In a typical application, a local telephone company or other commercial carrier connects one or more fiber optic cables to a connection unit or box in a communications room at a customer's location. Each fiber optic cable generally has a plurality of fiber optic strands, and each fiber optic strand is generally connected to a separate connector in the connection unit. The connectors of the connection units are also coupled to internal lines routed to adapters, jacks or other types of connectors at specific locations within the customer's building. Connection units are usually wall or rack mounted, often in a communications room. Communications rooms are usually small rooms, or even closets, and must contain one or more connection units. To maximize the number of connection units that can fit in the limited space of a typical communications room, it is generally desirable to mount a number of connection units in a single rack.

With a typical rack-mount connection unit, a number of connection units are stack mounted in a single rack. The fiber optic cables or individual fiber optic strands typically pass from one connection unit to the next through side ports in the connection units in a manner that has a portion of the fiber optic cables outside of the connection units and exposed. The fiber optic cables may also pass vertically between connection units through enclosed cable holes in the top and bottom panels of the connection units. The vertically oriented fiber optic cables are typically endwise threaded through the cable holes in the connection units. Additionally, to prevent dust and other particulate matter from entering the connection units, barrier grommets or shielding grommets are typically used in the cable holes of the connection units.

Conventional connection units also typically have a cable-storage ring around which the fiber optic strands of the fiber optic cable are wound to store an extra length of strands in the connection units. In accordance with industry standards, a conventional cable-storage ring holds about one meter of extra length of each fiber optic strand in the connection units. Additionally, because the minimum bend radius of a typical fiber optic strand is approximately 1.18 inches before signal attenuation occurs, each cable-storage ring has a guide surface with a radius greater than 1.18 inches.

Conventional connection units typically have features that are relevant to three stages of operation. The first stage is the installation stage in which the local telephone company or other vendor initially installs the connection units into the communications room and the fiber optic cables into the connection units. The second stage is the continuous operation of the connection units in which simple repairs and minor reconfigurations occur. The third stage is when major changes or reconfigurations are required, such as adding a new cable and connecting additional fiber optic strands to available connectors in the connection units or removing an existing cable.

Conventional rack-mount and wall-mount connection units have several limitations in facilitating the user to meet the objectives of the three operating stages. One limitation specific to side access rack-mount connection units is that a portion of the fiber optic cable is exposed between connection units. As a result, conventional side access rack-mount connection units may not adequately protect the fiber optic cable in the three operation stages because a tool or other object may accidentally hit and damage the exposed portions of the fiber optic cable. On the other hand, a limitation of conventional rack-mount connection units that vertically pass a cable through enclosed cable holes in the top and bottom panels of the units is that it is difficult to vertically thread the cable through a number of individual connection units in a large stack. Accordingly, vertical access rack-mount connection units may not provide easy installation of the cable or reconfiguration of the connection units.

Conventional rack-mount and wall-mount connection units also may not adequately prevent or inhibit particulate matter from entering the connection units in all three stages. A few conventional connection units do not block the cable holes with a seal or barrier grommet to prevent particulate matter from entering the cavity of the connection units. Additionally, most conventional units that use barrier grommets use a relatively hard, stiff barrier grommet that is difficult to cut and interferes with the cable as the cable is threaded through the connection unit. Accordingly, the grommets make installation and reconfiguration difficult and do not adequately inhibit dust and other particulate matter from entering the connection units.

Another limitation of conventional rack-mount connection units is that it is difficult to perform repairs or major reconfigurations. A conventional connection unit generally stores about one meter of extra length of each fiber optic strand on a cable-storage ring so that the ends of the fiber optic strands may be removed from the connection unit and manipulated at a nearby table. One meter of extra length of each strand, however, is often not sufficient to reach a table unless the table is immediately adjacent to the connection unit. While a connection unit has been designed using a pair of cable-storage rings in spaced apart position so that the fiber optic strands can be wound thereon with a figure-eight pattern or as desired, it is difficult to separate an individual fiber optic strand from the bundle of strands wrapped around the pair of storage rings because optical fibers do not have sufficient memory to maintain a given configuration and they must be tensioned to prevent them from pulling off of the storage rings and scattering randomly throughout the connection unit. Accordingly, a technician must unwrap the entire cable from the storage rings and release the tension on all of the fiber optic strands, while maintaining control of the strands, in order to separate an individual strand from the bundle of strands. This makes it difficult to repair the fiber optic strands or install a significant number of new fiber optic strands in conventional connection units.

Still another limitation of rack-mount and wall-mount connection units is that they do not provide a cost-effective system to expand and provide additional fiber optic connections. A typical 5.25 inch high connection unit has 72 connectors for connecting 72 fiber optic strands to separate internal building lines, and a conventional 1.75 inch high connection unit has 24 connectors for connecting 24 fiber optic strands to separate internal building lines. Although many initial installations are T-1 connections with 24 channels that require 24 fiber optic connectors, it is still often desirable to initially install a 5.25 inch connection unit to provide the extra capacity to incrementally expand the number of lines to 72 because a business may outgrow the single T-1 connection. However, the connectors are a relatively costly component of the connection units, and thus providing significantly more connectors in a connection unit than actually needed for the initial installation can significantly increase the initial cost of a connection unit.

In light of the limitations associated with conventional rack-mount and wall-mount connection units, it is desirable to develop a universal connection unit that is versatile and effectively operates in all three stages of operation.

SUMMARY OF THE INVENTION

The present invention is a versatile multimedia connection unit or box for managing fiber optic cables and distributing individual fiber optic strands to separate connectors. In a preferred embodiment, the connection unit has a rectilinear housing defining a cavity with a distribution cell and a patch cell, a plurality of open-ended cable ports at various locations in the housing along its outer edges to pass fiber optic cable into the cavity, and a plurality of stackable cable-storage members adjustably attached to the housing to store extra fiber optic cable in the distribution cell. The connection unit also preferably has a removable front door hingedly attached to the front of the housing to provide access to the patch cell, a removable top door hingedly attached to the top of the housing to provide access to the distribution cell, and a removable rear door hingedly attached to the rear of the housing to provide additional access to the distribution cell. The front and rear doors pivot between a closed position in which the doors are raised to close the cavity, and an open position in which the doors are lowered to provide access to the cavity. In a preferred embodiment, the front and rear doors have stops that prevent the doors from pivoting downwardly beyond an angle of more than approximately 90° so that the front and rear doors may be used as workshelves upon which small tools and components may be temporarily placed.

The open-ended ports provide easy installation and manipulation of fiber optic cables into the distribution and patch cells. The plurality of ports preferably includes side ports through side panels of the housing, and pairs of vertically aligned ports in top and bottom panels of the housing at both the front and rear edges of the connection unit. In a preferred embodiment, each port has a rim recessed inwardly towards the cavity, an open end defined by an opening at an edge of the housing or the top door, and a closed end formed in a portion of a panel of the housing or the top door. In one example of the operation of the ports, a vertically oriented cable may be inserted into a pair of vertically aligned ports formed in the top and bottom panels at the rear edge of the housing by removing the rear door, moving the cable laterally through the open end of the ports, and re-attaching the rear door to the housing. Thus, when a plurality of connection units are stacked on each other, the cable may be passed through and between the connection units without exposing the cable, and the cable may be selectively installed or removed from a single connection unit without threading the cable endwise through the other connection units.

A plurality of barrier grommets are preferably attached to the recessed rims of the ports to inhibit dust from entering the cavity. Each barrier grommet extends across the port and may be cut at a job site to receive a cable, and the barrier grommets are preferably made from a relatively soft, resilient material that conforms to the cables positioned within the cut to inhibit particulate matter from entering the cavity of the housing.

The storage members are preferably rings or spools that are movably attached to the bottom panel of the housing in the distribution cell. In one embodiment, each storage member has a guide surface with a curvature greater than a minimum bend radius of the fiber optic strands, a lower cross-bar extending across an interior portion of the guide surface, and an upper shelf located over at least a portion of the lower cross-bar. The lower cross-bar preferably has a slot to receive a threaded stud projecting upwardly from the bottom panel of the housing and holes spaced apart from the ends of the slot. Additionally, the upper shelf preferably has holes spaced apart from one another by the same distance as the holes in the lower cross-bar.

In a preferred embodiment, the plurality of storage members includes first and second bottom storage members movably attached to the bottom panel of the housing, a first top storage member releasably attached to the first bottom storage member, and a second top storage member releasably attached to the second bottom storage member. The first and second bottom storage members may be moved along the bottom panel between a released position with the storage members moved toward each other in which a single fiber optic strand may be easily removed from the storage members, and a hold position with the storage members moved away from each other in which the fiber optic strands are securely held on the storage members. The first and second top storage members preferably carry releasable fasteners in the holes of their lower cross-bars that engage the holes in the upper shelves of the first and second bottom storage members. The top storage members may accordingly be stacked on the bottom storage members and held in position by the releasable fasteners so that the guide surface of each top storage member is located immediately over in coaxial alignment with the guide surface of the corresponding bottom storage member. The top storage members provide additional capacity to increase the extra length of the fiber optic strands that can be stored within the distribution cell or to increase the number of fiber optic strands that can be stored within the distribution cell.

The connection unit also preferably has a bulkhead attached to a bulkhead bracket that is fixed to the housing in the cavity at a location that divides the cavity into the distribution cell and the patch cell. The bulkhead preferably has a plurality of cards mounted to the bracket that include connector cards with a plurality of connectors and blank cards without connectors. Each connector on a connector card has a distribution end in the distribution cell to which an individual fiber optic strand may be coupled and a patch end in the patch cell to which an internal building line may be coupled to optically couple the strand and line together. The connector cards and the blank cards are preferably releasably attached to the bulkhead bracket in the cavity so that blank cards may be replaced with connector cards to easily increase the number of connectors in the connection unit as needed.

DETAILED DESCRIPTION OF THE INVENTION

Figure 1:
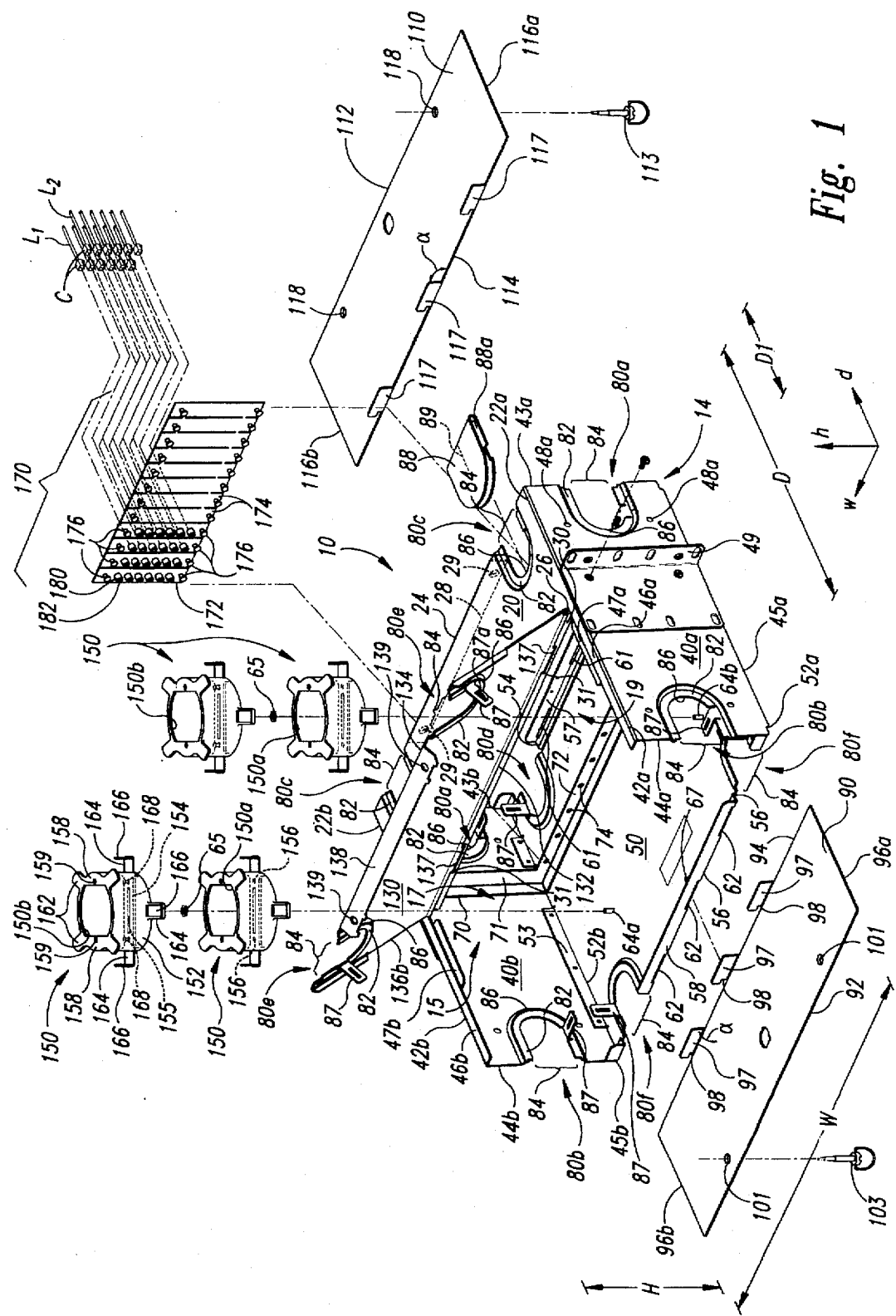
FIG. 1 is an exploded isometric view of an embodiment of a universal multimedia connection unit in accordance with the present invention.
Figure 2:
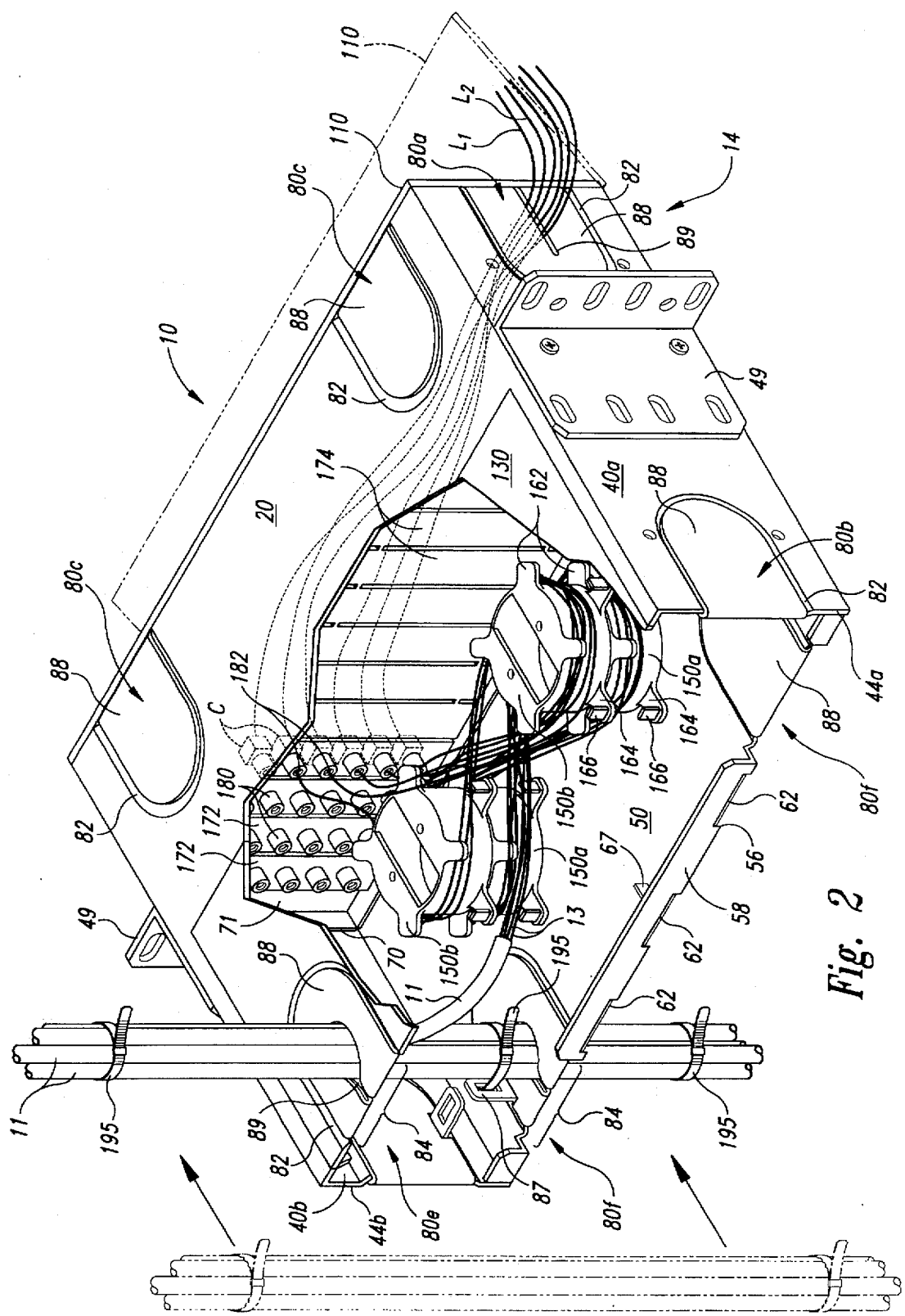
FIG. 2 is a partially assembled isometric view of the multimedia connection unit of FIG. 1.

FIGS. 1-4, in which like reference numbers refer to like parts, illustrate one embodiment of a multimedia connection unit in accordance with the present invention. The illustrated multimedia connection unit is a rack-mount connection unit for use with fiber optic cables, but many aspects of the invention are also useful in wall-mount connection units. Accordingly, the invention includes both wall-mount and rack-mount connection units.

As shown in the drawings for purposes of illustration, the present invention is embodied in a multimedia connection unit 10 for managing fiber optic cables 11 (shown in FIG. 2) and coupling a plurality of individual fiber optic strands 13 of each cable (shown in FIG. 2) to corresponding communication lines L in a building. The connection unit 10 has a housing 14 that defines a primary cavity 15 with a distribution cell 17 and a patch cell 19. The distribution cell 19 houses the fiber optic cables 11 and the fiber optic strands 13 that comprise each cable, and the patch cell 19 houses a patch side of a plurality of connectors 180. The connection unit 10 also preferably includes a plurality of cable ports 80 (specifically identified in the drawings by reference numerals 80a-80f) extending through various wall panels and doors of the connection unit 10 to pass the fiber optic cable 11 into the cavity 15, and a rear door 90, a front door 110 and a top door 130 removably and pivotally attached to the various wall panels of the housing 14 to provide easy access to within the distribution cell 17 and the patch cell 19. A plurality of movable, stackable storage members 150 for managing the fiber optic strands 13 are preferably positioned in the distribution cell 17, and a plurality of interchangeable connector cards 172 with connectors 180 and blank cards 174 without connectors are releasably attached to a bulkhead frame 70 located in the cavity 15 at a position defining the demarcation between the distribution cell 17 and the patch cell 19. The connectors 180 each couple a fiber optic strand 13 to a line L. The preferred structure and advantages of the connection unit 10 are described in greater detail below.

In a preferred embodiment, the housing 14 has a top panel 20, first and second opposing side panels 40a and 40b, and a bottom panel 50 opposing the top panel. The housing 14 preferably has a rectilinear shape with a width W along a width axis w, a height H along a height axis h, and a depth D along a depth axis d. The housing 14, however, is not limited to a particular shape.

The top panel 20 of the housing 14 preferably has a front edge 24 extending parallel to the width axis w at the front of the housing 14 and an intermediate edge 26 extending parallel to the front edge 24 at an intermediate depth $D_1$. The top panel 20 also has first and second side edges 22a and 22b extending parallel to the depth axis d from the front edge 24 to the intermediate edge 26. As discussed in greater detail below, the front edge 24 preferably has a downwardly depending front lip 28 with a number of holes 29 for receiving releasable lock fasteners 113 carried by the front door 110, and the intermediate edge 26 has a downwardly projecting lip 30 with two slots 31 to which the top door 130 is pivotally attached.

The first and second side panels 40a and 40b of the housing 14 extend relative to the height axis h between the bottom panel 50 and the first and second side edges 22a and 22b of the top panel 20, respectively. Additionally, the first and second side panels 40a and 40b extend relative to the depth axis d between the front and rear of the housing 14. The first side panel 40a preferably has a front edge 43a extending parallel to the height axis h between the front edge 24 of the top panel 20 and the bottom panel 50. The first side panel 40a also has a top edge 42a that extends along the first side edge 22a of the top panel 20 to the intermediate depth $D_1$ of the housing 14. The top edge 42a also extends between the intermediate edge 26 of the top panel 20 to a rear edge 44a of the first side panel 40a. The front edge 43a and the rear edge 44a are accordingly spaced apart from each other by the depth D of the housing 14. The first side panel 40a also has a bottom edge 45a extending parallel to the depth axis d between the front edge 43a and the rear edge 44a, a shoulder 47a projecting inwardly from the top edge 42a, and a number of holes 48a drilled therethrough to securely mount a bracket 49 to the housing 14. The first and second side panels 40a and 40b are preferably similarly constructed, and thus the reference numbers used for the parts of the second side panel 40b correspond to the reference numbers of the parts of the first side panel 40a. Additionally, another bracket 49 (shown in FIG. 2) is attached to the second side panel 40b opposite to the bracket 49 attached to the first side panel 40a.

The bottom panel 50 of the housing 14 preferably has first and second side edges 52a and 52b attached to the bottom edges 45a and 45b of the first and second side panels 40a and 40b, respectively. The bottom panel 50 also has a front edge 54 with an upwardly projecting front lip 57, and a rear edge 56 with an upwardly projecting rear lip 58. A number of threaded studs 64a and 64b project upwardly from the bottom panel 50 for attachment of a lower pair of storage members 150 to the housing 14 in position immediately adjacent to the bottom panel using nuts 65. As discussed in greater detail below, the bottom panel 50 also has three slots 61 extending parallel to the width axis w at the front edge 54 to removably receive three hinges 117 of the front door 110, and has three slots 62 extending parallel to the width axis w at the rear edge 56 to removably receive three hinges 97 of the rear door 90.

The housing 14 may have many different embodiments and still be within the scope of the invention. The panels of the housing 14, for example, may be individual parts that are connected with welds and/or fasteners. Alternatively, the panels may be integrally formed with each other and bent along adjoining edges to for the desired structure. In the embodiment shown in the drawings, the side panels 40a and 40b are integrally formed with the top panel 20 and bent downwardly along their top edges 42a and 42b. The bottom panel 50 is a separate component that has a number of attachment flanges 53 projecting upwardly from its first and second side edges 52a and 52b (shown only along the second side edge 52b) to attach the bottom panel 50 to the side panels 40a and 40b with welds or fasteners.

The frame 70 is preferably positioned in the cavity 15 slightly forward of the intermediate depth $D_1$ and separates the distribution cell 17 from the patch cell 19. Now also referring to FIG. 3A, which is a front elevational view of a stack of three connection units 10, the frame 70 has a lower rail 72a abutting the bottom panel 50, an upper rail 72b (shown only in FIG. 3A) abutting the top panel 20, and styles 71 attached to the interior surfaces of the side panels 40a and 40b. The rails 72a and 72b each have a plurality of holes 74 spaced apart by a predetermined spacing so that each hole 74 in the lower rail 72a is vertically aligned with a corresponding hole 74 in the upper rail 72b. As discussed in greater detail below, the plurality of connector cards 172 and blank cards 174 are releasably attached to the rails 72a and 72b to form a bulkhead 170 through which the fiber optic strands 13 are coupled to the lines L.

The doors 90, 110 and 130 attached to the housing 14 provide easy access to both the distribution cell 17 and the patch cell 19. In a preferred embodiment, the rear door 90 is pivotally attached to the rear lip 58 of the bottom panel 50 to provide access to the distribution cell 17, the top door 130 is pivotally attached to the intermediate lip 30 of the top panel 20 to provide additional access to the distribution cell 19 when the connection unit 10 does not have another connection unit stacked on top of it, and the front door 110 is pivotally attached to the front lip 57 of the bottom panel 50 to provide access to the patch cell 19.

The rear door 90 preferably has a top edge 92, a bottom edge 94, and first and second side edges 96a and 96b. The three hinges 97 project away from the bottom edge 94 of the rear door 90 at an angle α, and each hinge 97 has a slot 98 at a common side between the hinge and the bottom edge of the rear door. The angle α is preferably less than approximately 90°, and more preferably 80° or less, to prevent the rear door 90 from opening beyond a horizontal position. As a result, the rear door 90 may be used as a workshelf upon which small components and tools may be placed and manipulated. In the preferred embodiment in which the rear door 90 opens to less than 80° from a plane within which the rear edges 44 are located, the rear lip 58 of the bottom panel 50 acts as a barrier to hold small work pieces and tools placed on the opened rear door that will tend to slide inward toward the rear lip. A pair of holes 101 are provided in the rear door 90 proximate to the top edge 92 thereof to receive releasable lock fasteners 103 that engage holes 139 in the top door 130 to releasably lock the rear door in a vertical closed position. One suitable type of fastener 103 is a quarter-turn lock fastener Model No. 82-16-220-16 manufactured by Southco Corporation of Concordville, Pa.

In a preferred embodiment, the rear door 90 is removably attached to the rear lip 58 of the bottom panel 50 by inserting each of the hinges 97 into a corresponding one of the three slots 62 at the rear edge 56 of the bottom panel 50. After the hinges 97 are inserted into the slots 62, the rear door 90 is translated towards the second sidewall 40b to position a portion of the rear edge 56 of the bottom panel 50 in each of the slots 98 of the hinges 97. The rear door 90 pivots about the rear edge 56 of the bottom panel 50 between a closed position in which the side edges 96a and 96b are vertical and adjacent to the rear edges 44 of the side panels 40, and an open position in which the hinges 97 engage the rear lip 58 to prevent the rear door 90 from opening more than the angle α with respect to the rear edges 44. When the rear door 90 is in the open position, a stop 67 attached to the interior surface of the rear lip 58 at the right side of the center slot 62 is positioned to engage and prevent lateral movement of the rear door 90 toward the first side panel 40a and thus prevent the rear door 90 from being removed from the housing 14.

The front door 110 is preferably removably attached to the front lip 57 of the bottom panel 50, and has a similar construction and operation as the rear door 90. Accordingly, the front door 110 has a top edge 112, a bottom edge 114, and side edges 116a and 116b. Additionally, the three hinges 117 project away from the bottom edge 114 at the angle α that is preferably less than 90°, and more preferably 80° or less, to prevent the front door 110 from opening beyond a horizontal position. The front door 110, accordingly, may also be used as a workshelf. The front door 110 is attached to the housing 14 by inserting each of the hinges 117 into a corresponding one of the three slots 61 at the front edge 54 of the bottom panel 50. As discussed above with respect to the rear door 90, the front door pivots about the front edge 54 of the bottom panel 50 between an open position in which the hinges 117 engage the front lip 57 to prevent the front door 110 from opening beyond an angle of approximately 90°, and a closed position in which the door is vertical. A pair of holes 118 are provided in the front door 110 proximate the top edge thereof at locations that align with the holes 29 in the front lip 28 of the top panel 20 when the front door 110 is closed. A releasable lock fastener 113 is positioned in each of the holes 118 to engage the holes 29 of the front lip 28 and releasably lock the front door 110 in the closed position so that the top edge 112 of the front door 110 is positioned adjacent to the front edge 24 of the top panel 20. In a preferred embodiment, the fasteners 113 are the same type used for the fasteners 103 for the rear door 90.

The top door 130 is preferably removably attached to the intermediate lip 30 of the top panel 20. The top door 130 has an intermediate edge 132 with two hinges 137, a rear edge 134 with a downwardly extending rear lip 138, and side edges 136a and 136b. The hinges 137 are each removably received in one of the two slots 31 located along the intermediate edge 26 of the top panel 20 to removably attach the top door 130 to the housing 14 and allow the top door 130 to pivot about the intermediate edge 26. In a preferred embodiment, shoulders 47a and 47b of the side panels 40a and 40b support the top door 130 when in a closed position so that the top door 130 and the top panel 20 are in approximately the same plane. Additionally, when the rear door 90 and the top door 130 are closed, each of the fastener 103 of the rear door 90 engages a hole 139 in the rear lip 138 of the top door to releasably lock the rear door 90 to the top door 130.

The rear door 90 and the top door 130 provide access to the distribution cell 17 to install, repair, or reconfigure the fiber optic cables 11 and the fiber optic strands 13. Since the height H of the connection unit 10 is generally 5.25 inches in a connection unit 10 of that standard size, and the depth of the distribution cell 17 is generally 6–12 inches, the top door 130 is convenient to provide increased access to the distribution cell 17. Additionally, since the rear door 90 and top door 130 are also removable they allow even greater access to the distribution cell 17 when one or both are removed. Accordingly, unlike connection units that do not have a top door 130 or do not have removable doors, the connection unit 10 enhances the access to the distribution cell 17 to make it easier to install, repair, and reconfigure fiber optic components.

Figure 3A:
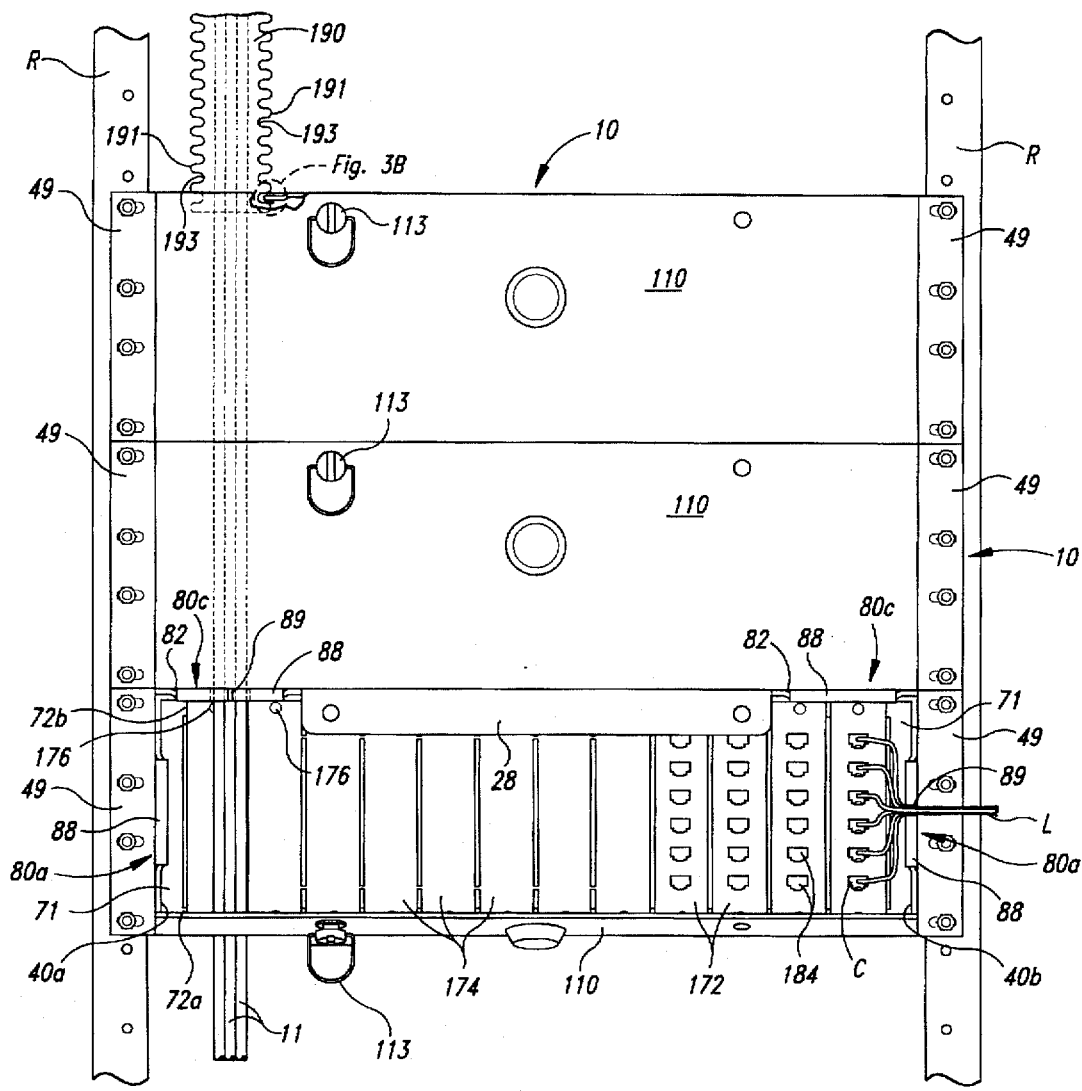
FIG. 3A is a front view of a plurality of multimedia connection units of FIG. 1 mounted in a rack in a stacked arrangement.
Figure 3B:
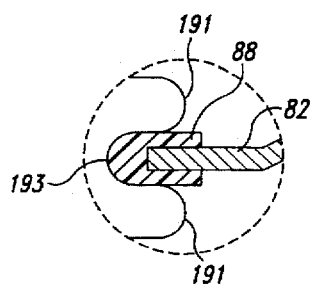
FIG. 3B is a partial cross-sectional view of a inter-duct attached to the top multimedia connection unit of FIG. 3A.

As discussed above, the connection unit 10 includes a plurality of cable ports 80 (identified by reference numerals 80a–80f) extending through the housing 14 and the top door 130 to receive the fiber optic cables 11 therein to facilitate their passage into and out of the housing 14 upon installation or reconfiguration. Each cable port 80 has a rim 82 to provide a surface to which a barrier grommet 88 may be attached to the housing 14. In a preferred embodiment applicable primarily to rack-mount connection units 10, the rims 82 are recessed inwardly towards the cavity 15 so that the barrier grommets 88 are flush with the exterior surface of the housing 14 and the top door 130. Accordingly, as best shown in FIG. 3A, the recessed rims 82 allow a number of connection units 10 to be attached to a rack R in a stacked configuration without being held apart by the thickness of the barrier grommets 88. Referring again to FIGS. 1 and 2, each port 80 also preferably has an opening or open-end 84 at an end thereof toward the edge of the panel or door in which the port 80 is positioned, and a closed-end 86 within a portion of the panel or door. In the illustrated embodiment, the ports 80 have a rounded shape at the closed-end 86 and are elongated with the open-end 84 defined by the intersection of the edge of the panel or door.

The cable ports 80 may be positioned at a plurality of locations through the housing 14 and the top door 130. In the illustrated embodiment, the cable ports 80 include a pair of opposing front side ports 80a at the front edges 43 of the opposing first and second side panels 40a and 40b, and a pair of opposing rear side ports 80b at the rear edges 44 of the first and second side panels. Additionally, the cable ports 80 also include first and second front top ports 80c at the front edge 24 of the top panel 20, and corresponding opposing first and second front bottom polls 80d at the front edge 54 of the bottom panel 50. Each front top port 80c is preferably positioned directly over a corresponding one of the front bottom ports 80d so that the first front top and bottom ports 80c and 80d at one side of the connection unit 10 define a first front pair of vertically aligned cable ports, and the second front top and bottom ports 80c and 80d at the other side of the connection unit define a second front pair of vertically aligned cable ports. In the illustrated embodiment, the cable ports 80 also include first and second rear top ports 80e at the rear edge 134 of the top door 130, and corresponding opposing first and second rear bottom ports 80f at the rear edge 56 of the bottom panel 50. Each rear top port 80e is preferably positioned directly over a corresponding one of the rear bottom ports 80f so that the first rear top and bottom ports 80e and 80f at one side of the connection unit 10 define a first rear pair of vertically aligned cable ports, and the second rear top and bottom ports 80e and 80f at the other side of the connection unit define a second rear pair of vertically aligned cable ports.

One of the barrier grommets 88 preferably covers each of the cable ports 80 and is formed from deformable, resilient material. In one embodiment, the barrier grommet 88 has an adhesive side 88a securely bonded to the recessed rim 82 of the cable port 80 with an adhesive. As best shown in FIG. 1, the barrier grommets 88 preferably have a full oval-shape, and they are preferably bent in half so that one-half of the adhesive side 88a adheres to the interior surface of the recessed rim 82 and the other half of the adhesive side adheres to the exterior surface of the recessed rim 82. After the barrier grommets 88 are attached to the ports 80, slits 89 are cut, usually at the job site, in the desired barrier grommets 88 to allow fiber optic cables 11 to be passed into the desired cable ports 80 of the connection unit 10. The unused cable ports are left completely sealed by the uncut grommets 88.

In a preferred embodiment, the barrier grommets 88 are made from a relatively soft material that easily deforms to allow the cables 11 to be moved easily through the slits 89 cut in the barrier grommets 88 without significant resistance. The barrier grommets 88 are also preferably made from a highly resilient material that conforms to the cables 11 placed in the slits 89. Accordingly, the barrier grommets 88 provide for easy installation or removal of cables 11, and form a barrier in the ports 80 around the cables 11 to substantially inhibit particulate matter from entering the cavity 15 of the housing 14 through the cable ports 80. One suitable material from which the barrier grommets may be made is Ensolite® manufactured by 3M Corporation of St. Paul, Minn., and one suitable adhesive is the 468MP Hi Performance Adhesive® also manufactured by 3M Corporation.

The preferred embodiment of the connection unit 10 provides several advantages for installing and manipulating fiber optic cables 11. One advantage of the preferred embodiment of the connection unit 10 is that it is easy to install and remove fiber optic cables in a stack of connection units mounted in a rack, such as the rack R shown in FIG. 3A. As discussed above in the Background section, it is desirable to vertically pass a cable through a stack of connection units to prevent the cable from being exposed outside of the connection units where it can be damaged. In conventional connection units, however, the cable must be vertically threaded in an endwise fashion through enclosed holes in the top and bottom panels of the conventional connection units comprising a stack. This makes it difficult to install a vertically oriented cable through a stack of conventional connection units mounted in a rack. Another problem is that, once installed, it is difficult to remove a conventional connection unit from such a stack because some of the fiber optic cables may extend through the enclosed holes and out beyond the particular connection unit to other units in the stack. As a result, the cables must be detached and removed from the other units to free the cables from the connection unit to be removed from the stack.

The preferred embodiment of the connection unit 10 of the present invention alleviates these problems by providing removable front and rear doors 110 and 90, and open-ended cable ports 80 with openings at the front and rear edges of the connection unit 10. The combination of removable doors and open-ended cable ports allows a vertically oriented fiber optic cable to be installed or removed from just one connection unit or all of the connection units by simply moving the cable laterally through the open end of the cable port. For example, the cable 11 passing through the first rear pair of vertically aligned ports 80e and 80f may be removed from the connection trait 10 by removing the rear door 90 from the housing 14, and then moving the cable 11 in the horizontal direction rearwardly through the slits 89 in the barrier grommets 88 until the cable 11 passes through the openings 84 at the rear edges of the top door 130 and the bottom panel 50. Similarly, to install a vertically oriented cable into the connection unit 10, the rear door 90 is removed from the housing 14, and then the cable 11 is moved in the horizontal direction forwardly through the slits 89 in the barrier grommets 88 into the first rear pair of vertically aligned ports 80e and 80f. It will also be appreciated that vertically oriented cables may be similarly removed or installed into the two pairs of vertically aligned front ports 80c and 80d at the front of the housing 14 by removing the front door 110 and moving the cables in the horizontal direction through the openings 84 of the front ports 80c and 80d. Referring to FIG. 3A, the cable 11 is shown vertically oriented and may easily be installed through a stack of three connection units 10 mounted in the rack R by repeating the simple process described above for each connection unit 10. Accordingly, a preferred embodiment of the connection unit 10 not only protects the fiber optic cables 11 by fully enclosing the cables within a stack of connection units 10, but it also provides easy installation and removal of vertically oriented cables into and from a stack of connection units 10 in the rack R.

In addition to providing easy installation and manipulation of the fiber optic cables 11, the rounded closed-ends 86 of the cable ports 80 are preferably sized and shaped to mate with a standard 1.5 inch diameter inter-duct 190 (shown in FIG. 3A). Now referring also to FIG. 3B, which is a partial cross section of a portion of FIG. 3A, a typical inter-duct 190 is a ribbed tube with a plurality of ribs 191 and valleys 193 alternating with one another along the length of the tube. In operation, the closed-end 86 of a cable port 80 receives a valley 193 of a convolution along the tube, and the ribs 191 adjacent to the valley 193 received in the closed-end 86 extend outwardly beyond the edge of the rim 82 of the port 80. A standard inter-duct 190 may accordingly be securely held by the rim 82 and the barrier grommet 88 at the closed-end 86 of cable port 80. Additionally, referring again to FIG. 1, each cable port 80 preferably has a tie-down post 87 associated therewith. The tie-down post 87 projects into the cavity 15 and preferably has a loop 87a. The cable 11 passing through the interduct 190 or a cable passing through the cable port 80 without use of the interduct may be secured to the tie-down post 87 to relieve strain on the cable 11. In a preferred embodiment, the cable 11 is tied to the tie-down post 87 with a one-way cinch 195 that is passed through the loop 87a.

Figure 4:
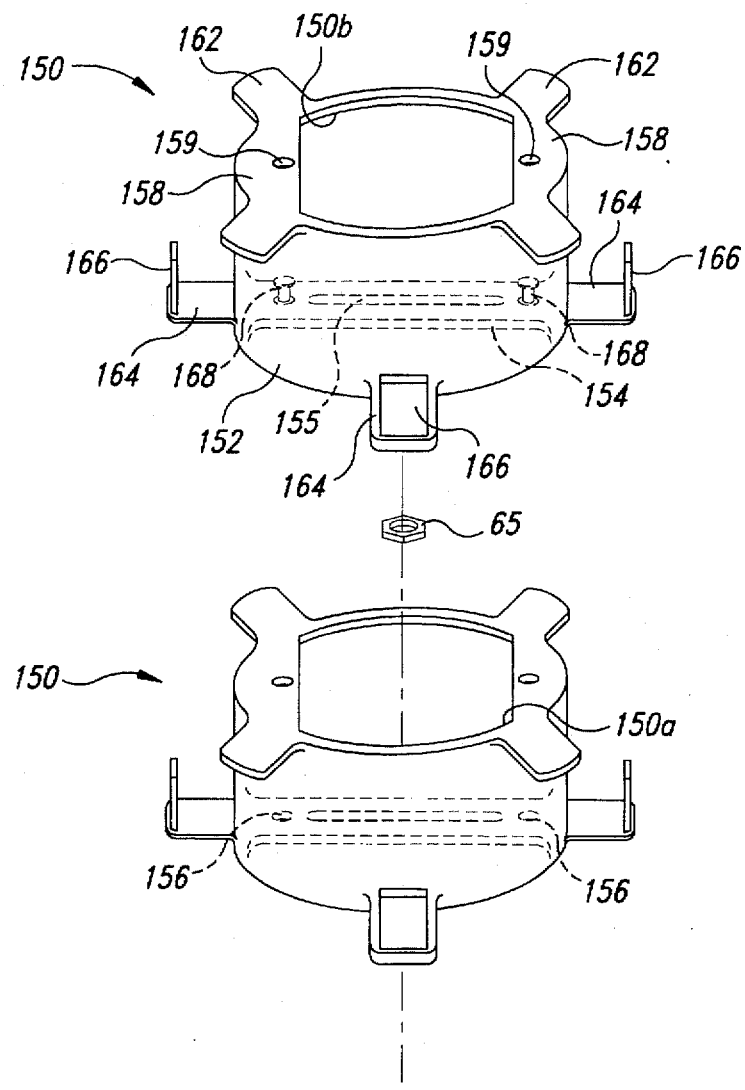
FIG. 4 is an isometric view of the top and bottom cable storage members of FIGS. 1 and 2.

As previously mentioned, the connection unit 10 also preferably includes a plurality of pairs of the storage members 150 for storing and managing a plurality of fiber optic cables 11 and fiber optic strands 13. As best shown in FIGS. 1 and 4 together, each storage member 150 is preferably a spool or ring with a curved guide surface 152 that has a curvature greater than the minimum bend radius of the fiber optic strands 13. The guide surface 152 is preferably a continuous surface with a cylindrical shape, but may have another type of surface with a different shape. For example, the guide surface 152 may be a series of closely spaced vertical plates or posts arranged to form the profile and at least a portion of a cylinder, ellipse, oval, or parabolic curve with the required curvature equal to or greater than the minimum bend radius of the fiber optic strands 13. Each guide member 150 also preferably has a lower cross-bar 154 extending across an inner portion of the storage member 150, and upper shoulders 158 positioned above and extending over at least part of the lower cross-bar 154. The lower cross-bar 154 preferably has a slot 155 through which one of the studs 64 on the bottom panel 50 projects when the storage member 150 is positioned resting on the bottom panel 50. Additionally, the lower cross-bar 154 preferably has a number of holes 156 spaced outward of and apart from the ends of the slot 155. The upper shoulders 158 of a storage member 150 each have a hole 159 that may be aligned with the holes 156 in the lower cross-bar 154 of another storage member 150 positioned atop the lower storage member in a stacked fashion. A plurality of upper retaining tabs 162 project radially outwardly from and beyond the top of the guide surface 152, and a plurality of lower retaining tabs 164 project radially outwardly from and beyond the bottom of the guide surface 152. In a preferred embodiment, a finger 166 also projects upwardly from the free end of each lower retaining tab 164.

A pair of storage members 150 are attached to the bottom panel 50 and an additional one or more pairs may be attached atop these as the vertical height within the distribution cell 17 permits. While a single storage member may be used, use of pairs is preferred. In the illustrated embodiment, two bottom storage members 150a are releasably attached to the bottom panel 50 by inserting the first threaded stud 64a through the slot 155 of one bottom storage member 150a, and inserting the second threaded stud 64b through the slot 155 of the other bottom storage member 150a. A nut 65 is tightened onto each stud 64 to secure the two bottom storage members 150a to the bottom panel 50. The nuts 65 can be loosened as needed to allow movement of the two bottom storage members 150a as will be described below. The studs 64, slots 155 and nuts 65 define one type of releasable fastener, but it will be appreciated that other releasable fasteners, such as clamps, may be used to releasably attach the storage members 150 to the bottom panel 50.

To increase the cable storage capacity of the connection unit 10, at least one additional storage member 150b is attached atop each of the bottom storage members 150a. The additional storage members 150b attached to the bottom storage members 150a preferably have releasable fasteners 168 carried in the holes 156 of their lower cross-bars 154 and projecting downward therebelow. Thus, to stack an additional storage member 150b on a bottom storage member 150a, the fasteners 168 of the additional storage member 150b are engaged with the holes 159 in the upper shoulders 158 of the bottom storage member 150a. The fasteners 168 are preferably releasable lock-pins, and one suitable fastener to releasably fasten the additional storage members 150a to the bottom storage members 150b is the two-piece Nylatch fastener Model Nos. HN3G and HN3P manufactured by Hartwell Corporation of Plancentia, Calif.

The storage members 150 provide several advantages for repairing and reconfiguring the fiber cables 11 and the fiber optic strands 13. One advantage of a preferred embodiment of the connection unit 10 is that the length of the fiber optic strands 13 stored in the distribution cell 17 may be increased by stacking a number of additional storage members 150b on each bottom storage member 150a. It will be appreciated that stacks of two or more storage members 150 will increase the length of the fiber optic strands 13 wrapped around the storage members 150. For example, two stacks of three storage members 150 may be assembled, with each stack held in place relative to the bottom panel 50 by one of the studs 64, and the fiber optic strands 13 may be wrapped around the first, second, and third levels of storage members 150 comprising the tri-level stacks until all three levels hold the maximum number of windings. Accordingly, previous connection units which utilized only a single pair of storage members held approximately one meter of the fiber optic strands 13. The stackable storage members 150 of a preferred embodiment of the invention using tri-level stacks can hold up to approximately three meters of fiber optic strands 13. A preferred embodiment of the connection unit 10, therefore, provides enough extra cable to work on an end of a fiber optic strand at a location that is up to three meters away from the connection unit 10.

Another advantage of the storage members 150 in a preferred embodiment of the connection unit 10 is that a specific fiber optic strand 13 may be easily removed from the bundle of fiber optic strands 13 wrapped around the storage members 150. In contrast to previous connection units utilizing a fixed pair of storage members, the storage members 150 are movable along the bottom panel 50 of the housing 14 without being detached from the bottom panel. To remove a specific fiber optic strand 13 from the storage members 150, the nut 65 on at least one of the studs 64 is loosened and the corresponding storage member 150 is moved as permitted by the stud 64 moving along the slot 155 to release the tension on the bundle of fiber optic strands 13. Both of the storage members 150 forming a cooperating pair may be moved if desired. The bundle of fiber optic strands 13, however, remains substantially intact because the storage member 150 is only moved a small distance and the fingers 166 on the lower retaining tabs 164 hold the fiber optic strands 13 in place. The specific fiber optic strand 13 to be removed is then removed from the storage members 150, and the loosened storage member 150 is slid back into place to re-tension the fiber optic strands 13 remaining on the storage members 150. The storage member 150 can also be loosened and moved again to allow the removed strand to be returned to the bundle wrapped around the pair of storage members. Accordingly, the movable storage members 150 enhance the ability to remove a specific fiber optic strand 13 from the bundle of fiber optic strands.

In addition to the features of the preferred embodiment of the connection unit 10 that enhance the ease and flexibility of installing and manipulating the fiber optic components in the distribution cell 17, the bulkhead 170 enhances the ability to increase the number of connectors 180 and inhibits dust or other particulate matter from passing between the distribution cell 17 and the patch cell 19. Any combination of the connector cards 172 and the blank cards 174 may be attached to the lower and upper rails 72a and 72b of the frame 70 with releasable fasteners 176. In a preferred embodiment, the connector cards 172 and the blank cards 174 have upper and lower releasable fasteners 176 that engage corresponding upper and lower holes 74 in the rails 72a and 72b to releasably attach the cards 172 and 174 to the frame 70. Suitable releasable fasteners 176 for the cards 172 and 174 are the two-piece Nylatch fasteners manufactured by Hartwell Corporation.

In a preferred embodiment, each connector card 172 has six connectors 180 that each has a distribution end 182 and a patch end 184. Each fiber optic strand 13 is coupled to the distribution end 182 of one of the connectors 180. Similarly, each line L in the building has a connector C that mates with the patch ends 184 of the connectors 180. FIG. 3A best illustrates the patching operation of the connection unit 10. For example, to transfer a telephone number assignment from one location in an office to another, a first line L corresponding to the original location is detached from the patch side 184 of the particular connector assigned to the telephone number, and then a second line L corresponding to the new location is coupled to the patch side 184 of the particular connector.

Another advantage of the preferred embodiment of the connection unit 10 is that the number of connectors 180 may be increased in a manner that does not significantly increase the cost of the initially installed connection unit. As discussed above in the Background section, many applications require only 24 connectors at the initial installation of the connection unit because many relatively large companies bring in a T-1 connection with 24 channels. As a business expands or an office building obtains more tenants, the capacity of a preferred embodiment of the connection unit 10 may be expanded in multiples of six connectors (when each connector card carries six connectors) by removing the desired number of blank cards 174 from the frame 70, and then attaching a corresponding number of connector cards 172 to the vacant sites on the frame 70. As noted, each connector card 172 carries six connectors 180, but the connector cards 172 may carry a different number of connectors allowing the capacity of the connection unit 10 to be changed by multiples other than six. It will be appreciated that the blank cards 174 are much less expensive than the connector cards 172. Accordingly, the use of the blank cards 174 to fill the space between the distribution cell 17 and the patch cell 19 until more connectors are needed reduces the cost of the connection unit 10 at the initial installation stage and still provides the ability to incrementally increase the number of connectors 180 available in the future.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A multimedia connection unit for coupling fiber optic strands of a fiber optic cable to communication devices, comprising:

a housing having a top panel, an opposing bottom panel, and opposing first and second side panels extending generally between the top and bottom panels, the housing defining a cavity therein in which a portion of the fiber optic cable and the fiber optic strands may be housed;

a door attached to the housing, the door being movable between an open position to allow access to the cavity and a closed position to close the cavity;

a cable port through a wall portion of one of the top panel, the first and second side panels, the bottom panel and the door to pass the fiber optic cable into the cavity, the cable port having a rim intersecting an edge of the wall portion to define an open end of the cable port at the edge, and a portion of the rim extending through the wall portion to define a closed-end of the cable port at an interior location of the wall portion, wherein the fiber optic cable may be laterally passed through the open end of the cable port and into the cable port when the open end is not blocked by the housing when the cable port is through the door and not blocked by the door when the cable port is through the housing; and a bulkhead positioned in the cavity to divide the cavity into a distribution cell and a patch cell;

a plurality of connectors positioned at the bulkhead, each of the connectors having a distribution end in the distribution cell and a patch end in the patch cell, the distribution end of each connector being connectable to an individual fiber optic strand and the patch end of each connector being connectable to an internal line in a building coupled to one of the communication devices.

2. The connection unit of claim 1, further comprising a resilient barrier grommet attached to the rim to cover the cable port, the barrier grommet being adapted to be cut to form a slit to receive the cable.

3. The connection unit of claim 2 wherein the rim is recessed inwardly toward the cavity of the housing so that the barrier grommet does not project outwardly beyond an exterior surface of the wall portion with the cable port.

4. The connection unit of claim I wherein the door is removably attached to a first edge of the bottom panel and the wall portion is a portion of the top panel at a first edge of the top panel, and the cable port is a top cable port and the connection unit further includes a bottom cable port through the bottom panel at a first edge of the bottom panel, the top and bottom cable ports being arranged in vertical alignment, the top cable port having a rim intersecting the top panel first edge to define the open end of the top cable port at the top panel first edge and the bottom cable port having a rim intersecting the bottom panel first edge to define an open end of the bottom cable port at the bottom panel first edge, wherein the open ends of the top and bottom cable ports are positioned to receive a vertically oriented fiber optic cable moved horizontally through the open ends of the top and bottom cable ports when the door is removed from the housing to install the fiber optic cable into the cavity.

5. A multimedia connection unit for coupling fiber optic strands of a fiber optic cable to communication devices, comprising:

a housing having a top panel, first and second side panels depending downwardly from the top panel, and a bottom panel attached to the first and second side panels under the top panel, the housing defining a cavity with a distribution cell at a rear portion of the housing in which a portion of the fiber optic cable and the fiber optic strands may be housed and a patch cell at a front portion of the housing in which internal lines coupled to the communication devices may be positioned;

a bulkhead positioned in the cavity to separate the distribution cell from the patch cell, the bulkhead having a plurality of connectors and each connector having a distribution end in the distribution cell and a patch end in the patch cell, the distribution end of each connector being connectable to an individual fiber optic strand and the patch end of each connector being connectable to an individual internal line coupled to a communication device to couple the individual fiber optic strand to the communication device;

a rear door attached to a rear edge of the housing, the door being movable between an open position to allow access to the distribution cell and a closed position to enclose the distribution cell;

a cable port through one of the top panel, the first and second side panels, the bottom panel, the door and the bulkhead to pass the fiber optic cable into the distribution cell; and a first bottom cable storage member attached to the bottom panel, the first bottom storage member having a first guide surface projecting upwardly from the bottom panel, the first guide surface being sized and shaped to receive the fiber optic strands around at least a portion of the guide surface with a bend radius greater than a minimum bend radius of the fiber optic strands to provide a surface around which the fiber optic strands may at least be partially wound;

a second bottom cable storage member moveably attached to the bottom panel and spaced apart from the first bottom storage member, the second bottom storage member having a lower mounting bar abutting the bottom panel and a second guide surface projecting upwardly from the mounting bar, the second guide surface being sized and shaped to receive the fiber optic strands around at least a portion of the second guide surface with a bend radius greater than a minimum bend radius of the fiber optic strands to provide another surface in combination with the first guide surface around which the fiber optic strands may be wound so that the fiber optic strands may be wrapped in a pattern around at least part of the first and second guide surfaces to extend between the first and second cable storage members, and one of the bottom panel and the lower mounting bar having a releasable fastener that is engageable with the other of the bottom panel and the lower mounting bar, the releasable fastener being securely engaged with the other of the bottom panel and the lower mounting bar to securely hold the second bottom cable storage member to the bottom panel in a storage position in which the fiber optic strands are tensioned between the first and second storage members to hold the fiber optic strands to the first and second storage members, and the releasable fastener being loosened from the other of the bottom panel and the lower mounting bar to allow the second bottom storage member to be moved across the bottom panel towards the first bottom storage member into a released position in which the fiber optic strands are relaxed to allow at least one individual fiber optic strand to be removed from the first and second storage members.

6. The connection unit of claim 5 wherein the releasable fastener comprises a slot in one of the bottom panel and the lower mounting bar of the second bottom cable member, a stud attached to the other of the bottom panel and the lower mounting bar, and a nut threadedly engaged with the stud, the stud being movable within the slot when the nut is loosened to allow the second bottom cable member to translate into the released position.

7. The connection unit of claim 6 wherein the slot is in the lower mounting bar of the second bottom cable storage member and the stud projects upwardly from the bottom panel.

8. The connection unit of claim 5, further comprising:

a first top cable storage member releasably attached to the first bottom cable storage member, the first top cable storage member having an upper first guide surface over the first guide surface of the first bottom cable storage member to provide an additional surface around which an extra length of fiber optic strands may at least be partially wound, wherein one of the first bottom cable storage member and the first top cable storage member has a releasable fastener that engages the other of the first bottom cable storage member and the first top cable storage member to releasably fasten the first top cable storage member to the first bottom cable storage member; and a second top cable storage member releasably attached to the second bottom cable storage member, the second top cable storage member having an upper second guide surface over the second guide surface of the second bottom storage member so that the fiber optic strands may be wrapped in a pattern around at least part of the upper first and second guide surfaces of the first and second top cable storage members to extend between the first and second top cable storage members, wherein one of the second bottom cable storage member and the second top cable storage member has a releasable fastener that engages the other of the second bottom cable storage member and the second top cable storage member to releasably fasten the second top cable storage member to the second bottom cable storage member.

9. A multimedia connection unit for coupling fiber optic strands of a fiber optic cable to communication devices, comprising:

a housing having a top panel, first and second side panels depending downwardly from the top panel, and a bottom panel attached to the first and second side panels under the top panel, the housing defining a cavity with a distribution cell at a rear portion of the housing in which a portion of the fiber optic cable and the fiber optic strands may be housed and a patch cell at a front portion of the housing in which internal lines coupled to the communication devices may be positioned;

a bulkhead positioned in the cavity to separate the distribution cell from the patch cell, the bulkhead having a plurality of connectors and each connector having a distribution end in the distribution cell and a patch end in the patch cell, the distribution end of each connector being connectable to an individual fiber optic strand and the patch end of each connector being connectable to an individual internal line coupled to a communication device to couple the individual fiber optic strand to the communication device;

a rear door attached to a rear edge of the housing, the door being movable between an open position to allow access to the distribution cell and a closed position to enclose the distribution cell;

a cable port through one of the top panel, the first and second side panels, the bottom panel, the door and the bulkhead to pass the fiber optic cable into the cavity; and a first bottom cable storage member attached to the bottom panel and projecting upwardly from the bottom panel, the first bottom cable storage member having a first guide surface with a size and shape to receive the fiber optic strands around at least a portion of the guide surface with a bend radius greater than a minimum bend radius of the fiber optic strands to provide a surface around which an extra length of fiber optic strands may at least be partially wound;

a first top cable storage member releasably attached to the first bottom cable storage member, the first top cable storage member having an upper first guide surface over the first guide surface of the first bottom cable storage member to provide an additional surface around which an extra length of fiber optic strands may at least be partially wound, wherein one of the first bottom cable storage member and the first top cable storage member has a releasable fastener that engages the other of the first bottom cable storage member and the first top cable storage member to releasably fasten the first top cable storage member to the first bottom cable storage member;

a second bottom cable storage member attached to the bottom panel apart from the first bottom cable storage member and projecting upwardly from the bottom panel, the second bottom cable storage member having a second guide surface with a size and shape to receive the fiber optic strands around at least a portion of the guide surface with a bend radius greater than a minimum bend radius of the fiber optic strands to provide another surface in combination with the first guide surface of the bottom cable storage member around which an extra length of fiber optic strands may at least be partially wound so that the fiber optic strands may be wrapped in a pattern around at least part of the first and second guide surfaces of the first and second bottom cable storage members to extend between the first and second bottom cable storage members; and a second top cable storage member releasably attached to the second bottom cable storage member, the second top cable storage member having an upper second guide surface over the second guide surface of the second bottom storage member so that the fiber optic strands may be wrapped in a pattern around at least part of the upper first and second guide surfaces of the first and second top cable storage members to extend between the first and second top cable storage members, wherein one of the second bottom cable storage member and the second top cable storage member has a releasable fastener that engages the other of the second bottom cable storage member and the second top cable storage member to releasably fasten the second top cable storage member to the second bottom cable storage member.

10. The connection unit of claim 9 wherein the first bottom cable storage member has an upper shoulder with a hole, the first top storage member has a lower cross-bar with an aperture, and the fastener comprises a releasable lock-pin positioned in the aperture that engages the hole in the upper shoulder to releasably attach the first top cable storage member to the first bottom cable storage member.

11. A multimedia connection unit for coupling fiber optic strands of a fiber optic cable to communication devices, comprising:

a housing having a top panel, first and second side panels depending downwardly from the top panel, and a bottom panel attached to the first and second side panels under the top panel, the housing defining a cavity with a distribution cell at a rear portion of the housing in which a portion of the fiber optic cable and the fiber optic strands may be housed and a patch cell at a front portion of the housing in which internal lines coupled to the communication devices of a building may be positioned;

a rear door attached to a rear edge of the housing, the rear door being moveable between an open position to allow access to the distribution cell and a closed position to enclose the distribution cell;

a front door attached to a front edge of the housing, the front door being moveable between an open position to allow access to the patch cell and a closed position to enclose the patch cell;

a cable port through one of the top panel, the first and second side panels, the bottom panel, and the rear door to pass the fiber optic cable into the distribution cell;

a bulkhead bracket attached to the housing in the cavity at a location defining a boundary between the distribution cell and the patch cell; and a bulkhead attached to the bulkhead bracket to separate the distribution cell from the patch cell, the bulkhead having a plurality of connector cards releasably attachable to the bulkhead bracket and at least one blank card releasably attached to the bulkhead bracket, each connector card including at least one connector and each connector having a distribution end in the distribution cell and a patch end in the patch cell, the distribution end of each connector being connectable to an individual fiber optic strand and the patch end of each connector being connectable to an individual internal line coupled to a communication device to couple the individual fiber optic strand to the communication device, wherein the at least one blank card may be removed from the bulkhead bracket to vacate a card site on the bulkhead bracket and an additional connector card may be attached to the bulkhead bracket at the vacated card site to increase the number of connectors in the bulkhead.

12. The connection unit of claim 11 wherein each connector card includes six connectors and the bulkhead bracket includes twelve card sites to which one of a connector card and a blank card may be interchanged with the other to selectively provide up to seventy-two connectors in the connection unit.

* * * * *

UNITED STATES PATENT AND TRADEMARK OFFICE
CERTIFICATE OF CORRECTION

PATENT NO.    :    5,737,475
DATED         :    April 7, 1998
INVENTOR      :    William D. Regester It is certified that an error appears in the above identified patent and that said Letters Patent is hereby corrected as shown below:

In column 14, claim 4, line 56, after "claim" delete "I" and substitute -- 1 --.

Signed and Sealed this

Eighth Day of February, 2000

*Attest:*

Q. TODD DICKINSON

*Attesting Officer*    *Commissioner of Patents and Trademarks*